Figure 1:
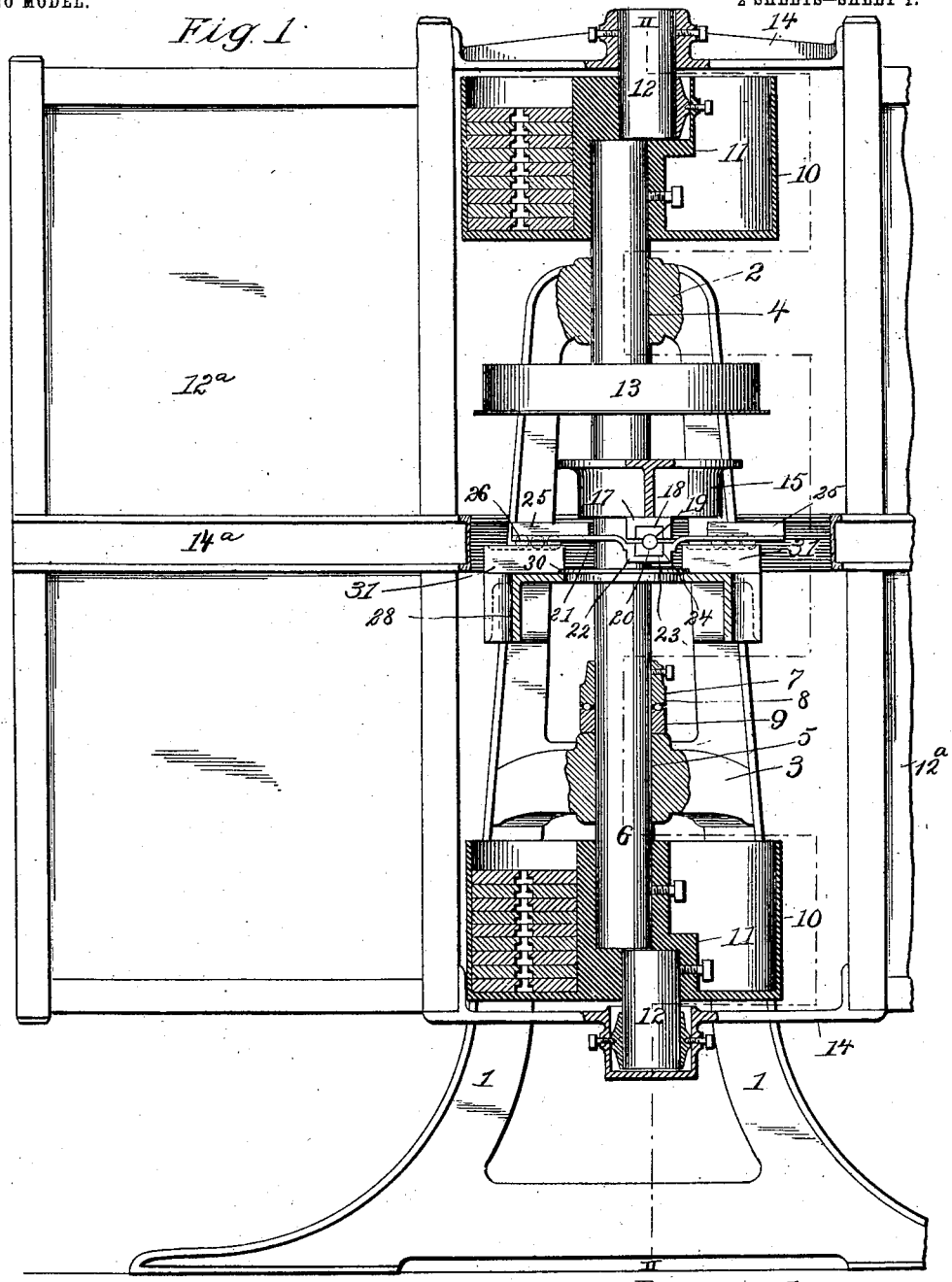

No. 720,114. PATENTED FEB. 10, 1903.
G. W. COMBS.
GYRATING MACHINE.
APPLICATION FILED JULY 18, 1901.
NO MODEL. 2 SHEETS—SHEET 1.

Witnesses
Arthur McArthur
H. C. Rodgers.

Inventor
George W. Combs
By Fischer & Sharpe
Attys.

No. 720,114. PATENTED FEB. 10, 1903.
G. W. COMBS.
GYRATING MACHINE.
APPLICATION FILED JULY 18, 1901.
NO MODEL. 2 SHEETS—SHEET 2.
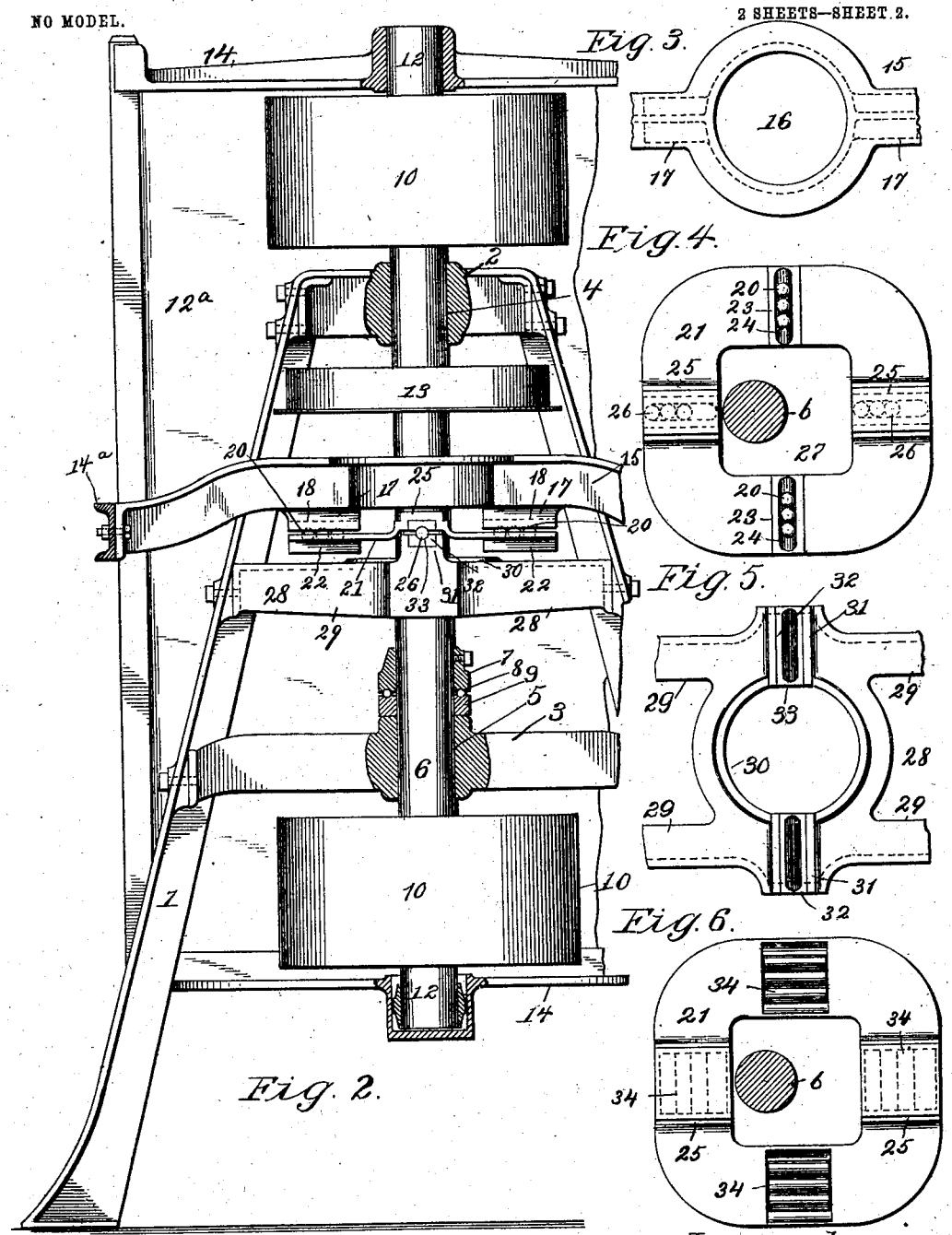
Witnesses:
Arthur McArthur
H. C. Rodgers
Inventor:
George W. Combs
By Fischer & Thorpe
Attys.

UNITED STATES PATENT OFFICE.

GEORGE W. COMBS, OF LEAVENWORTH, KANSAS.

GYRATING MACHINE.

SPECIFICATION forming part of Letters Patent No. 720,114, dated February 10, 1903.

Application filed July 18, 1901. Serial No. 68,765. (No model.)

*To all whom it may concern:*

Be it known that I, GEORGE W. COMBS, a citizen of the United States, residing at Leavenworth, in the county of Leavenworth and State of Kansas, have invented certain new and useful Improvements in Gyrating Machines, of which the following is a specification.

My invention relates to improvements in gyrating machines, especially that class employed in flouring-mills; and it may be said to consist in the novel arrangement and construction of the supporting parts for the sieve-boxes, whereby the latter when in motion are maintained in a horizontal plane throughout their course and prevented from swaying or twisting, which motion tends to spread the stock unequally over the screens, and thus prevent them from properly performing their work.

A further object is to reduce the friction between the working parts to a minimum. This I accomplish by interposing peculiarly-constructed ball or roller bearings between said parts, whereby I am enabled to operate a machine with the greatest economy of power.

Referring now to the drawings, which illustrate my invention, Figure 1 is a side elevation of a machine, partly in section, provided with my improvements. Fig. 2 is a vertical cross-section of same, taken on line II II of Fig. 1. Fig. 3 is a broken plan view of the upper bridge-tree forming part of my invention. Fig. 4 is a plan view of the rectangular bearing-block which is interposed between the stationary and movable framework. Fig. 5 is a broken plan view of the lower bridge-tree forming part of my invention. Fig. 6 is a plan view of a modified form of bearing-block.

In the machine illustrated the stationary frame is pyramidal in form and consists of two supporting-legs 1, united by upper and lower braces 2 and 3, respectively. Said braces have centrally-located bearings 4 5 to receive a rotatable vertical shaft 6, having a rigidly-secured cup 7, which rests upon antifriction-balls 8, interposed between cup 7 and another cup 9, suitably secured upon bearing 5 for the purpose of assisting in supporting the shaft and its load when in motion with the least possible friction.

10 indicates the customary balancing-drums, rigidly secured to the opposite terminals of the shaft and provided with eccentrically-bored hubs 11 to receive crank-pins 12, which drive the sieve-boxes 12$^a$. 13 indicates the flanged drive-pulley, rigidly secured to the shafts 6. 14 represents arms connecting the upper and lower portions of the sieve-boxes to the crank-pins. Said sieve-boxes are further secured together by two oppositely-located channel-bars 14$^a$, secured together at their central portions by a supporting bridge-tree 15, arched at its center and having a central annular opening 16, which permits it to gyrate around shaft 6 without interfering therewith. Bridge-tree 15 is provided at its under side, contiguous to its annular opening, with two oppositely-disposed integral bearings 17, grooved to receive hardened bearing-blocks 18, provided with longitudinal ball-races 19, which rest upon antifriction-balls 20. Balls 20 are supported by a rectangular bearing-block 21, provided with lower grooved bearings 22 to receive hardened bearing-blocks 23, with ball-races 24, which extend parallel with ball-races 19 and between which the balls are interposed. Bearing-block 21 is also provided with upper grooved bearings 25, similar to those above mentioned, and extending at right angles thereto to receive anti-friction-balls 26. It is also provided with a central rectangular opening 27 to permit its free movement around shaft 6.

28 designates the lower supporting bridge-tree, which consists of two oppositely-disposed arms 29, rigidly secured at their outer terminals to the legs 1 and formed integral with a central annular flange 30 of greater diameter than shaft 6, as shown. Bridge-tree 28 is provided with two oppositely-disposed upper grooved bearings 31, having hardened bearing-blocks 32 with ball-races 33 to receive antifriction-balls 26.

In large machines, where the work is heavy, rollers 34 may be substituted for the balls, if desirable, to prolong the wearing qualities of the bearings.

By arranging the ball or roller bearings, as above described, the sieve-boxes when in motion are driven with the greatest economy of power and at the same time held to a positive and even course, thus insuring the proper distribution of the stock over the screens, so the latter can perform their work of separating the stock into different grades of flour.

Having thus described the invention, what I claim as new, and desire to secure by Letters Patent, is—

1. In a gyrating machine, a stationary frame, a centrally-located compound bearing comprising a bearing on the stationary frame, an intermediate block arranged to reciprocate thereon, and an upper bearing adapted to reciprocate on the intermediate block at right angles to the movement of said block; an upright shaft with corresponding cranks or eccentrics above and below the compound bearing, and a gyrating body secured to the cranks or eccentrics, and the upper bearing, substantially as described.

2. In a gyrating machine, a stationary frame, a central crank-shaft journaled therein, a bridge-tree secured to the stationary frame and provided with a central aperture for the passage of the crank-shaft, two diametrically-disposed bearings on the upper surface of the bridge-tree, a bearing-block provided with a central aperture for the passage of the crank-shaft, bearings on the under side thereof reciprocably mounted on the bridge-tree bearings, diametrically-disposed bearings on the upper side of the bearing-block arranged at right angles to those on its under side, a bridge-tree secured to the gyrating body, and provided with a central opening for the passage of the crank-shaft, and diametrically-disposed bearings on the under side thereof reciprocably mounted upon the upper bearings of the bearing-block, substantially as described.

3. In a gyrating machine, a central stationary frame, a central crank-shaft journaled therein, a bridge-tree secured to the stationary frame and provided with a central opening for the passage of the crank-shaft, bearings arranged on the upper side of the bridge-tree, a bearing-block reciprocably mounted upon said bearings, and provided with a central opening for the passage of the crank-shaft, bearings on the upper surface of the bearing-block arranged at right angles to those on its lower side, a bridge-tree reciprocably mounted upon said upper bearings, provided with a central opening for the crank-shaft, and secured at its opposite ends to the central portion of the gyrating body, substantially as described.

In testimony whereof I affix my signature in the presence of two witnesses.

GEORGE W. COMBS.

Witnesses:
A. S. SCHOTT,
F. D. COMBS.